(12) United States Patent
Zhang et al.

(10) Patent No.: US 7,961,869 B1
(45) Date of Patent: Jun. 14, 2011

(54) HANDS-FREE VOICE COMMUNICATION APPARATUS WITH SPEAKERPHONE AND EARPIECE COMBO

(75) Inventors: Ming Zhang, Cupertino, CA (US); Jie Yu, Nanjing (CN)

(73) Assignee: Fortemedia, Inc., Cupertino, CA (US)

( * ) Notice: Subject to any disclaimer, the term of this patent is extended or adjusted under 35 U.S.C. 154(b) by 1278 days.

(21) Appl. No.: 11/352,684

(22) Filed: Feb. 13, 2006

Related U.S. Application Data

(60) Provisional application No. 60/708,701, filed on Aug. 16, 2005.

(51) Int. Cl.
*H04M 1/00* (2006.01)
*H04M 9/00* (2006.01)

(52) U.S. Cl. ........... 379/420.04; 379/428.02; 455/569.1; 455/575.1

(58) Field of Classification Search .................. 379/430, 379/406.07, 406.05, 406.01, 406.03, 428.01, 379/420.01–420.04; 455/569.1, 570, 574, 455/575.1, 575.6, 550.1
See application file for complete search history.

(56) References Cited

U.S. PATENT DOCUMENTS

| | | | |
|---|---|---|---|
| 7,003,099 B1 * | 2/2006 | Zhang et al. | 379/406.03 |
| 7,415,294 B1 * | 8/2008 | Zhang et al. | 455/575.6 |
| 2004/0264610 A1 * | 12/2004 | Marro et al. | 375/347 |
| 2005/0014537 A1 * | 1/2005 | Gammon et al. | 455/575.1 |
| 2005/0037825 A1 * | 2/2005 | Faranda Cordella et al. | 455/575.9 |
| 2005/0105740 A1 * | 5/2005 | Dyer | 381/16 |

* cited by examiner

*Primary Examiner* — Davetta W Goins
*Assistant Examiner* — Phylesha Dabney
(74) *Attorney, Agent, or Firm* — Thomas|Kayden

(57) ABSTRACT

A hands-free voice communication apparatus includes a speakerphone and earpiece combo, a digital signal processing (DSP) module, and a communication module. The hands-free apparatus may be used as a speakerphone or an earpiece. The speakerphone and earpiece combo includes a loudspeaker and one or multiple microphones. The loudspeaker provides an acoustic output. Each microphone receives an acoustic input and provides an input signal. The DSP module performs digital signal processing on the input signals from the microphones and provides an output signal for the loudspeaker. The DSP module may perform digital signal processing with different sets of parameters for the speakerphone and earpiece modes. The communication module provides communication between the hands-free apparatus and a communication device, e.g., a cellular phone or a wireless PDA.

22 Claims, 7 Drawing Sheets

HANDS-FREE VOICE COMMUNICATION APPARATUS WITH SPEAKERPHONE AND EARPIECE COMBO

CROSS-REFERENCES TO RELATED APPLICATIONS

This application claims the benefit of provisional U.S. Application Ser. No. 60/708,701, entitled "Small Footprint Speakerphone and Earpiece Combo with Beamforming," filed Aug. 16, 2005, which is incorporated herein by reference in its entirety for all purposes.

BACKGROUND

The present invention relates generally to communication, and more specifically to a hands-free voice communication apparatus.

Hands-free voice communication devices are commonly used for various applications such as speakerphone, earpiece/headset, hands-free car kit, teleconferencing system, cellular phone, hands-free voice recognition device, and so on. A speakerphone device allows a near-end user to speak into one or more microphones placed at some distance away from the near-end user and to listen to sound from a far-end user via a loudspeaker also placed away from the near-end user. An earpiece/headset device allows a user to communicate with privacy and with hands-free operation. In general, hands-free devices are convenient and comfortable to use and are also safer to use than hands-on or handheld devices in certain situations, e.g., when driving a car or when the user's hands are busy.

A hands-free device typically supports hands-free voice communication with a loudspeaker/receiver and one or more microphones. When the hands-free device is small in size, the close proximity of the loudspeaker to the microphones may cause some major problems. For example, when a speech signal from a far-end user is outputted from the loudspeaker, a portion of this speech signal may be reflected back to the microphones and transmitted back to the far-end user. This acoustic disturbance is referred to as echo and is annoying to the far-end user. In certain instances, the hands-free device may cause acoustic shock or howling due to instability resulting from the microphones picking up reflections of the acoustic signal emitted by the loudspeaker.

Hands-free devices are described in various literatures including U.S. Patent Application Serial Nos. 2003/0157973 and 2004/0033820. Application Serial No. 2003/0157973 describes installing an earpiece inside a cellular phone and using a switch to select between the cellular phone and the earpiece. Application Serial No. 2003/0157973 does not describe a speakerphone feature for the cellular phone. Application Serial No. 2004/0033820 describes a handset that communicates via infrared with a hands-free kit having an earpiece. Application Serial No. 2004/0033820 does not address the integration of a speakerphone.

As can be seen, a hands-free voice communication device that can effectively provide hands-free communication is highly desirable.

SUMMARY

A hands-free voice communication apparatus with a speakerphone and earpiece combo is described herein. An earpiece may also be called a headset. The hands-free apparatus supports hands-free voice communication via a speakerphone or an earpiece. The earpiece is functional in a default mode and may be used for voice communication with privacy. The speakerphone is functional when selected and may be used for voice communication with convenience.

In an embodiment, the hands-free apparatus includes a speakerphone and earpiece combo, a digital signal processing (DSP) module, a communication module, and buttons to control the operation of the hands-free apparatus. The speakerphone and earpiece combo includes a loudspeaker and one or multiple microphones. The loudspeaker provides an acoustic output. In an embodiment, two microphones are present, one microphone is used as a main microphone, and the other microphone is used as a reference microphone. Each microphone may be an omni-directional microphone or a directional microphone. Each microphone receives acoustic input and provides an input signal. The DSP module performs digital signal processing on the input signals from the microphones and provides an output signal for the loudspeaker. The communication module provides communication between the hands-free apparatus and a communication device, which facilitates communication with a far-end user.

In an embodiment, the hands-free apparatus may be operated in a speakerphone mode or an earpiece mode. In the speakerphone mode, the hands-free apparatus is located relatively far from a user's ear, and the DSP module may perform digital signal processing in accordance with a first set of parameters that can more effectively deal with higher loudspeaker volume and far field pickup. In the earpiece mode, the hands-free apparatus is located at close proximity to the user's ear, and the DSP module may perform digital signal processing in accordance with a second set of parameters that can provide better sound quality for this mode.

The hands-free apparatus may be a standalone device that is used with a wireless or wireline communication device. Alternatively, the hands-free apparatus may be part of a communication device. For example, the hands-free apparatus may be an accessory for a cellular phone or a personal digital assistant (PDA).

Various aspects, embodiments, and features of the invention are described in further detail below.

DETAILED DESCRIPTION

A hands-free voice communication apparatus may be implemented in various manners. In an embodiment, the hands-free apparatus includes a speakerphone and earpiece combo and may be used as a speakerphone or an earpiece, as described below. The hands-free apparatus may include any number of microphones. For clarity, various embodiments of a hands-free apparatus with two microphones are described below.

A hands-free voice communication apparatus may be a part of and/or may be used together with a wireless or wireline communication device. The communication device may be a cellular phone (which is also called a handset), a cordless phone, a wireless PDA, a walkie-talkie, a personal computer (PC), or some other communication device. The hands-free apparatus may communicate with the communication device via a wireline or wireless connection.

Figure 1:
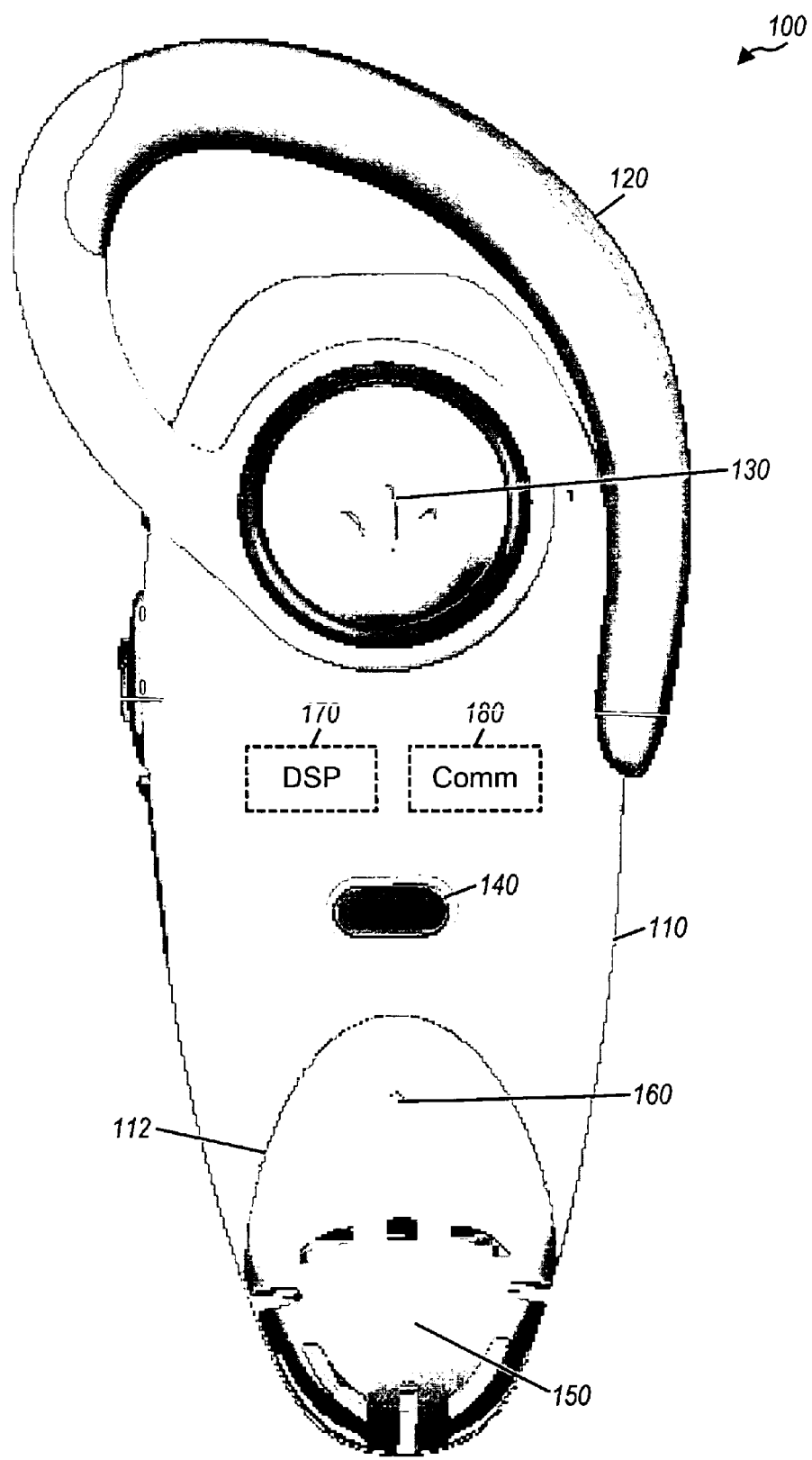
FIG. 1 shows a front view of a hands-free voice communication apparatus with a speakerphone and earpiece combo.

FIG. 1 shows a front view of an embodiment of a hands-free voice communication apparatus 100 having a speakerphone and earpiece combo. Hands-free apparatus 100 includes a case 110, a microphone cover 112, an earhook 120, a loudspeaker 130, a mode switch button 140, a main microphone 150, a reference microphone 160, a DSP module 170, and a communication module (Comm) 180. Hands-free apparatus 100 may also include other electronic components such as, e.g., a battery, an antenna, other buttons, and so on, which are not shown in FIG. 1 for simplicity.

Earhook 120 may be used to mount hands-free apparatus 100 over a user's ear and to hold apparatus 100 securely against the user. Earhook 120 may be a removable piece that may be attached to case 110 in various manners.

Loudspeaker 130 provides an acoustic output. Loudspeaker 130 may be mounted to case 110 with an acoustic opaque resilient material. This material reduces vibration from loudspeaker 130 to case 110 but does not alter the acoustic signal from the loudspeaker. Loudspeaker 130 may also be disposed within a loudspeaker chamber (not visible in FIG. 1) that is formed within case 110. This chamber may be formed specifically to house loudspeaker 130 and to enhance the loudspeaker's volume and quality.

In general, hands-free apparatus 100 may include any number of microphones, e.g., one, two, three, or possibly more microphones. If multiple microphones are present, then one or more microphones may be used as the main microphone(s), and one or more remaining microphones may be used as the reference microphone(s). In general, each microphone may be an omni-directional microphone or a directional microphone. Each microphone may be mounted in a microphone boot that is formed with an acoustic opaque resilient material, as described below.

For the embodiment shown in FIG. 1, two microphones 150 and 160 are present. In an embodiment that is assumed for much of the description below, main microphone 150 is a directional microphone, and reference microphone 160 is an omni-directional microphone. Main microphone 150 may comprise a single directional microphone, several omni-directional microphones, or several directional microphones. Main microphone 150 may have any beam pattern. For example, main microphone 150 may be a uni-directional microphone having a uni-directional polar pattern or a cardioid microphone having a heart-shaped beam pattern. Microphone cover 112 covers both microphones 150 and 160, as shown in FIG. 1.

DSP module 170 may include a digital signal processor that performs signal processing and/or other circuitry that performs other pertinent functions. An embodiment of DSP module 170 is described below.

Communication module 180 supports communication between hands-free apparatus 100 and a communication device. The communication device may be a cellular phone, a cordless phone, a wireless PDA, a walkie-talkie, a PC coupled to a network, and so on. The communication device provides end-to-end communication between a near-end user of hands-free apparatus 100 and a far-end user at a remote site. Communication module 180 may be a wireless module that may implement Bluetooth, IEEE 802.11 (which is also called Wi-Fi), a cordless phone channel, and/some other wireless protocol. Communication module 180 may also be a wireline module that may implement Universal Serial Bus (USB) or some other wireline protocol. Communication module 180 may also support both wireless and wireline communication.

In an embodiment, hands-free apparatus 100 may be used in a speakerphone mode or an earpiece mode. In the speakerphone mode, hands-free apparatus 100 is placed away from a user, e.g., on a table. In the speakerphone mode, loudspeaker 130 and microphones 150 and 160 are farther away from the user, and DSP module 170 performs digital signal processing in accordance with a first set of parameters that can more effectively deal with higher loudspeaker volume and far field pickup. In the earpiece mode, hands-free apparatus 100 is mounted over the user's ear. In the earpiece mode, loudspeaker 130 and microphones 150 and 160 are closer to the user, and DSP module 170 performs digital signal processing in accordance with a second set of parameters that can provide better sound quality for this mode. Mode switch button 140 is used to select the speakerphone mode or the earpiece mode.

Figure 2:
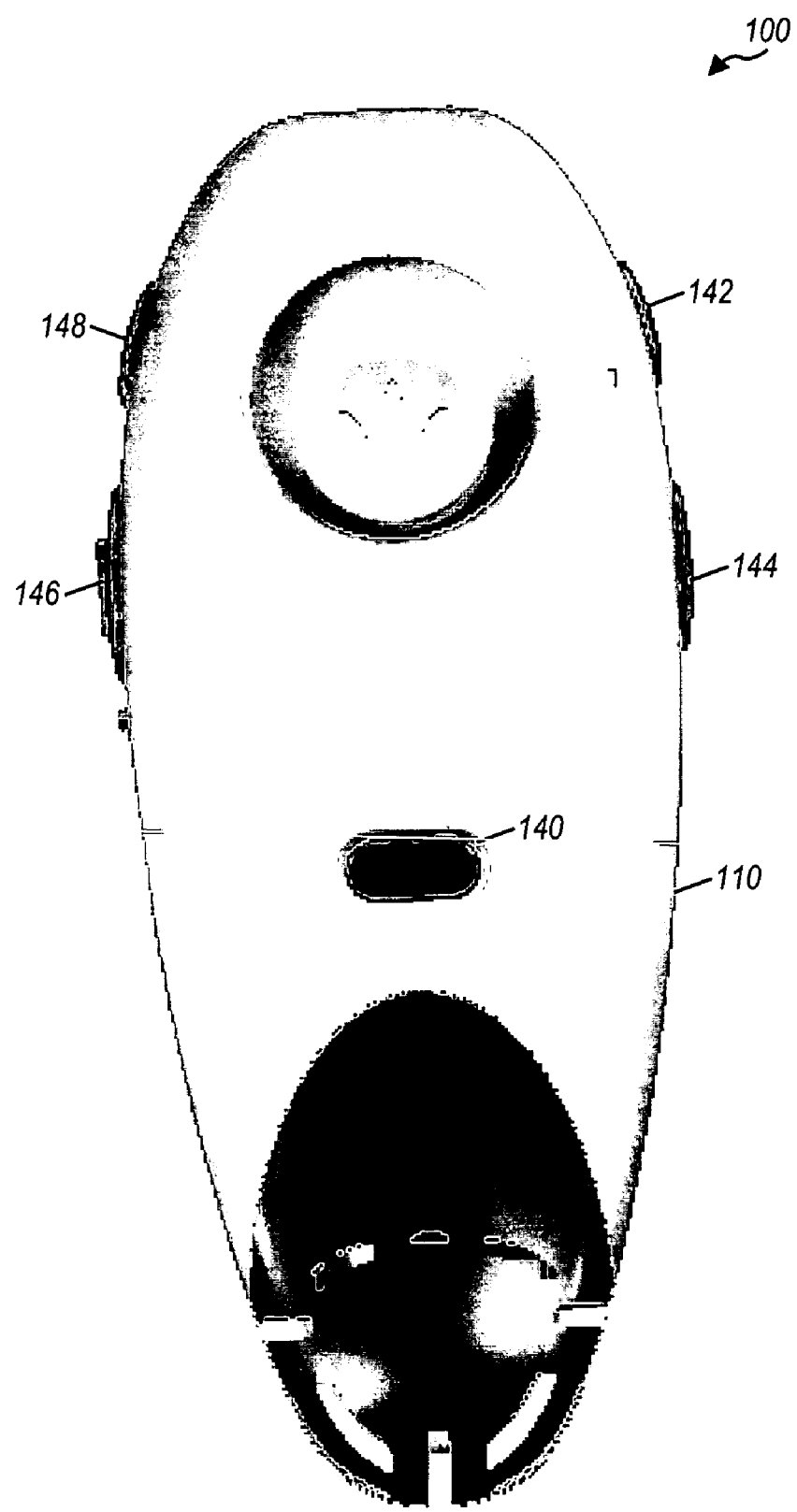
FIG. 2 shows a front view of the hands-free apparatus without an earhook.

FIG. 2 shows a front view of hands-free voice communication apparatus 100 with earhook 120 removed. This view more clearly shows additional buttons for hands-free apparatus 100. For the embodiment shown in FIG. 2, hands-free apparatus 100 includes a volume up button 142, a volume down button 144, a talk (accept/reject call) button 146, a microphone mute button 148, and mode switch button 140. Volume up button 142 and volume down button 144 are used to adjust the volume of loudspeaker 130 up and down, respectively, to a desired sound level. Talk button 146 is used to accept or reject an incoming call, e.g., a telephone call. Talk button 146 is used frequently and, for ease of use, may be made bigger than the other buttons. Microphone mute button 148 is used to mute microphones 150 and 160 during a call.

Mode switch button 140 is used to switch between the speakerphone mode and the earpiece mode. Mode switch button 140 may be formed with sufficient size to allow for ease of user selection, e.g., by depressing the button. In an embodiment, mode switch button 140 is hidden to avoid accidental mode selection by the user. This may be achieved by (1) placing mode switch button 140 at a location between the user's face and hands-free apparatus 100 whether the apparatus is worn on the user's ear and (2) having mode switch button 140 recessed below the surface of case 110.

Various techniques may be used to protect the user's ear from excessively loud sound from accidental selection of the speakerphone mode. In an embodiment, the default mode of hands-free apparatus 100 is the earpiece mode, and the volume of loudspeaker 130 is set to a comfortable level with loudspeaker 130 pressed against the user's ear. In another embodiment, to avoid accidental switching to the speakerphone mode, the user is required to press (1) mode switch button 140 multiple times within a short period of time or (2) mode switch button 140 in combination with at least one other button such as a volume up button, e.g., at the same time or within a short period of time. In yet another embodiment, when switched to the speakerphone mode, the sound volume is increased gradually to provide the user with sufficient time to get out of the speakerphone mode if this mode is not desired.

In general, any number of buttons may be used to provide the desired control functions for hands-free apparatus 100.

The buttons may be located anywhere on hands-free apparatus 100. Some of the buttons shown in FIG. 2 may also be omitted or combined.

Figure 3:
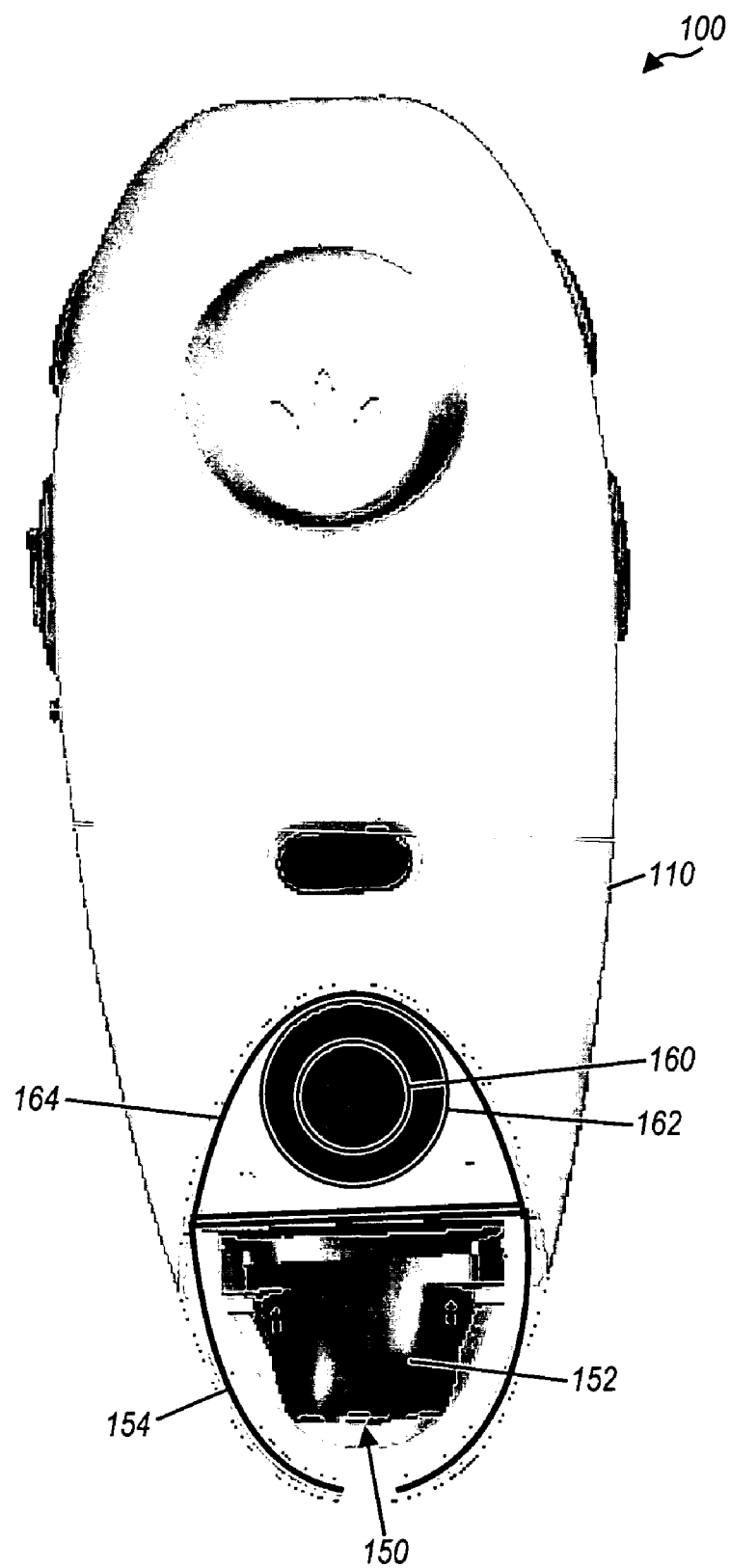
FIG. 3 shows a microphone arrangement for the hands-free apparatus.

FIG. 3 shows an embodiment of a microphone arrangement for hands-free voice communication apparatus 100. In an embodiment, main microphone 150 has a uni-directional polar pattern, and reference microphone 160 has an omni-directional polar pattern. Main microphone 150 is installed in a specially designed microphone boot 152 having several holes, as described below. Microphone boot 152 with microphone 150 is mounted within a housing 154. Microphone boot 152 may be placed such that it touches housing 154 as little as possible in order to reduce vibration from the loudspeaker received by uni-directional microphone 150. Reference microphone 160 is also installed in a microphone boot 162. Microphone boot 162 with microphone 160 is mounted within a housing 164. In an embodiment, microphone housings 154 and 164 are isolated from each other when microphone cover 112 is installed. Microphone boots 152 and 162 may be made of an acoustic opaque resilient material.

Figure 4A:
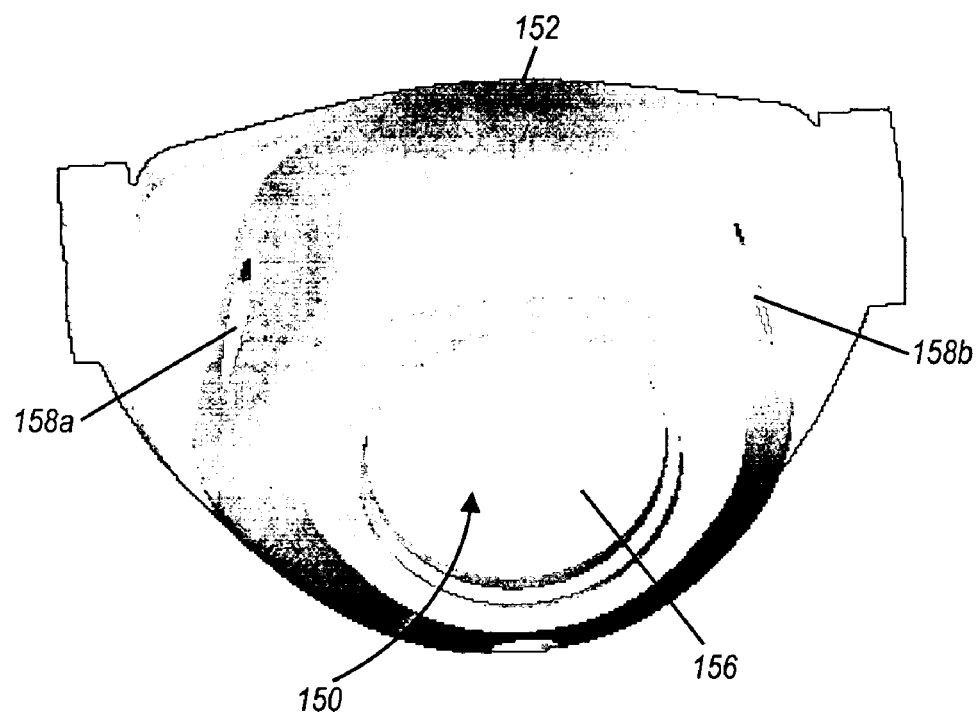
FIG. 4A shows a front view of a microphone boot for a directional microphone.

FIG. 4A shows a front view of microphone boot 152 for directional main microphone 150. Directional microphone 150 is placed inside of a cavity 156 formed within microphone boot 152. Two openings/holes 158a and 158b are formed on the left and right sides of microphone boot 152 toward the back of directional microphone 150. Holes 158a and 158b allow sound to travel to the back of directional microphone 150.

Figure 4B:
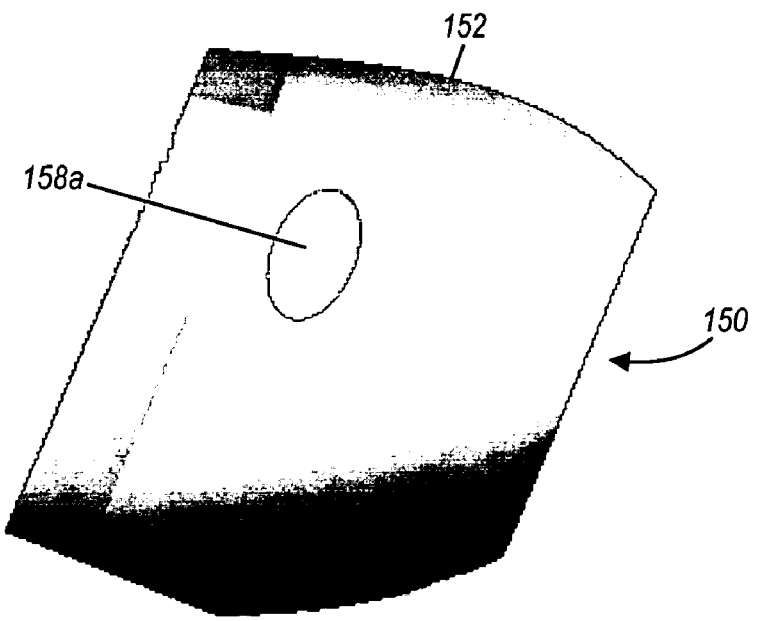
FIG. 4B shows a side view of the microphone boot.

FIG. 4B shows a left side view of microphone boot 152. Hole 158a is formed on the left side to allow sound to travel to the back of the directional microphone.

Figure 5:
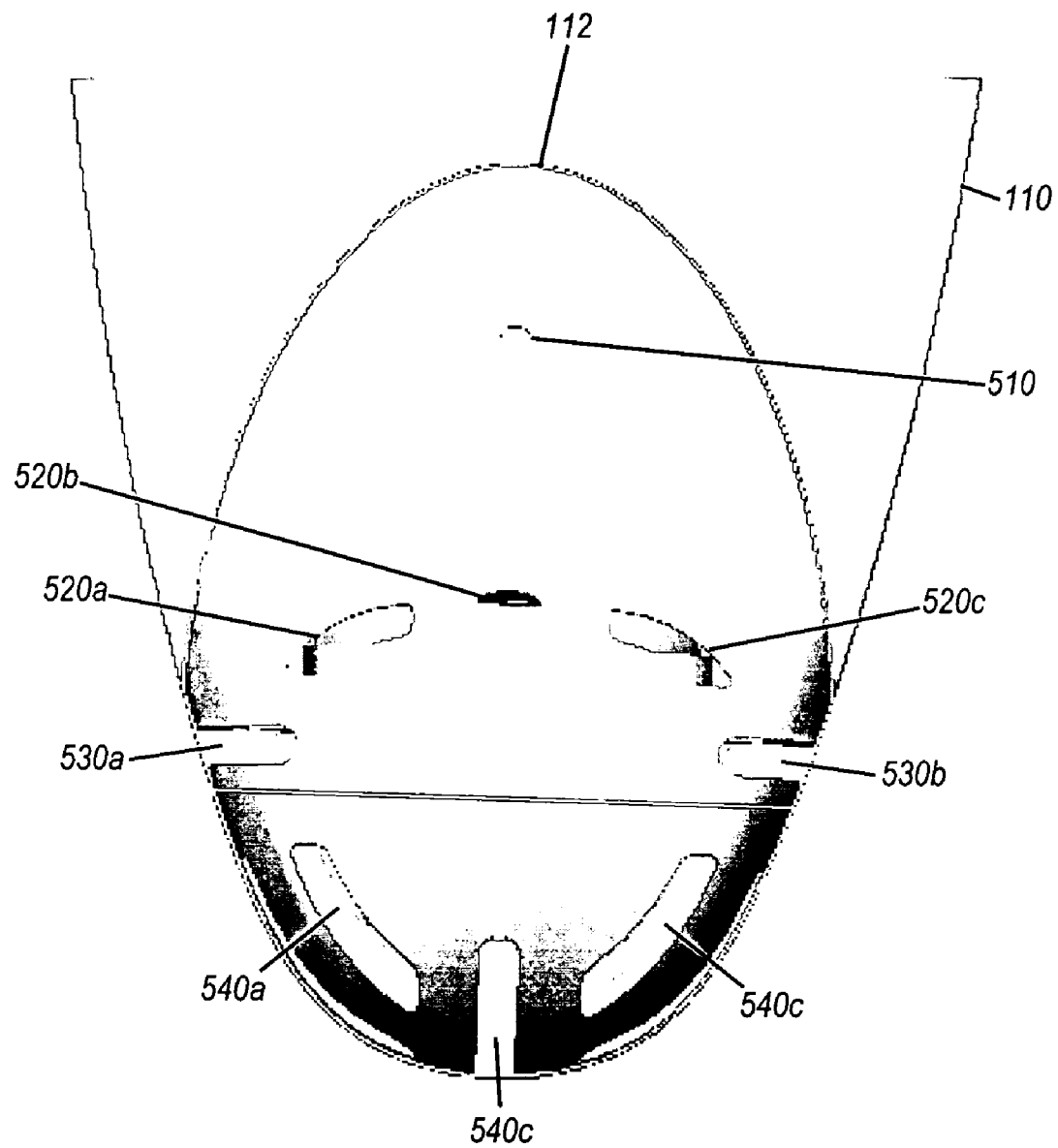
FIG. 5 shows openings for the microphones within the hands-free apparatus.

FIG. 5 shows various holes formed on microphone cover 112 for microphones 150 and 160. A small hole 510 is formed over housing 164 for omni-directional reference microphone 160. Several holes 520a, 520b and 520c are formed over housing 154 for directional main microphone 150 toward the rear of microphone boot 152 to allow sound to flow to the back of microphone 150. Two holes 530a and 530b are formed on the left and right sides and toward the back of directional microphone 150 to also allow sound to go to the back of the directional microphone. Several holes 540a, 540b and 540c are formed in front of directional microphone 150 to allow sound to reach the front of the microphone.

Figure 6A:
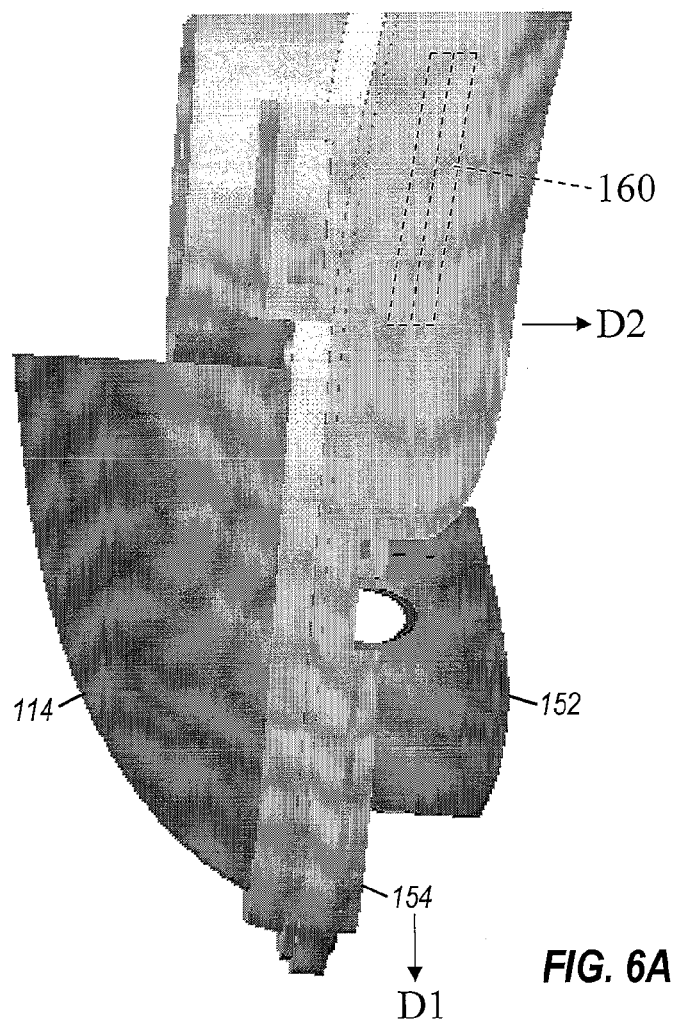
FIGS. 6 and 6B show an anti-vibration design for the directional microphone.
Figure 6B:
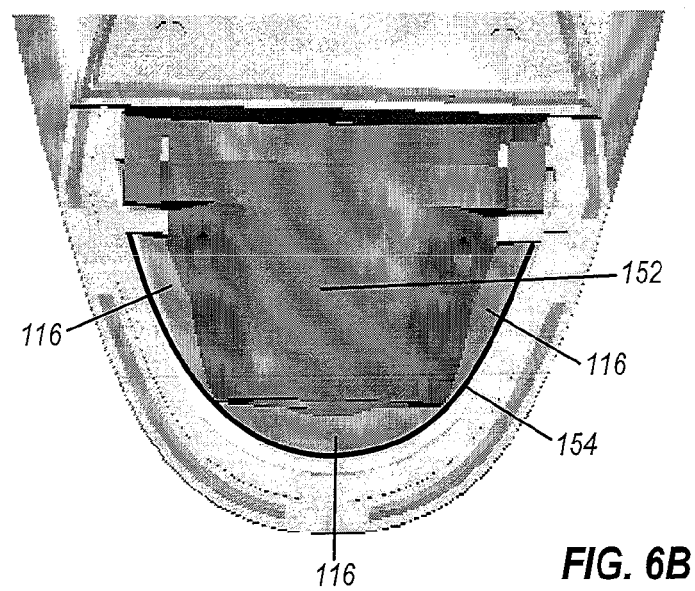

FIGS. 6A and 6B show an exemplary anti-vibration design for directional main microphone 150. In general, directional microphones are more sensitive to vibration than omni-directional microphones. The anti-vibration design attempts to alleviate or dampen the vibration at directional microphone 150. This vibration may be due to the sound from loudspeaker 130, especially at high volume. Microphone boot 152 holds directional microphone 150 and is mounted in housing 154. The microphone 150, which has a uni-directional polar pattern, is mounted toward a first direction D1. Reference microphone 160, which has an omni-directional polar pattern, is mounted in housing 164 toward a second direction D2 substantially Perpendicular to the first direction D1. A block 114 of a vibration opaque resilient material (e.g., a rubber-like material) is attached to the bottom of housing 154. Gaps 116 of sufficient width are provided around microphone boot 152 to allow directional microphone 150 to avoid making direct contact with housing 154 (to the extent possible).

FIGS. 1 through 6B show specific embodiments of a hands-free voice communication apparatus. The hands-free apparatus may also be implemented in other manners, with any number of loudspeakers and any number of microphones for the speakerphone and earpiece combo. The DSP module may be implemented within hands-free apparatus 100, as shown in FIG. 1. Alternatively or additionally, a DSP module may be implemented within a communication device with which hands-free apparatus 100 communicates.

A hands-free voice communication apparatus with a speakerphone and earpiece combo is highly desirable. For privacy purpose, a user may use the earpiece for communication. For convenience and ease of use, the user may use the speakerphone for communication by simply pressing the appropriate button(s). Since the loudspeaker and the microphones are placed close together for the speakerphone and earpiece combo, echo may be a problem. Digital signal processing may be used to remove as much echo as possible and to achieve good voice quality.

Figure 7:
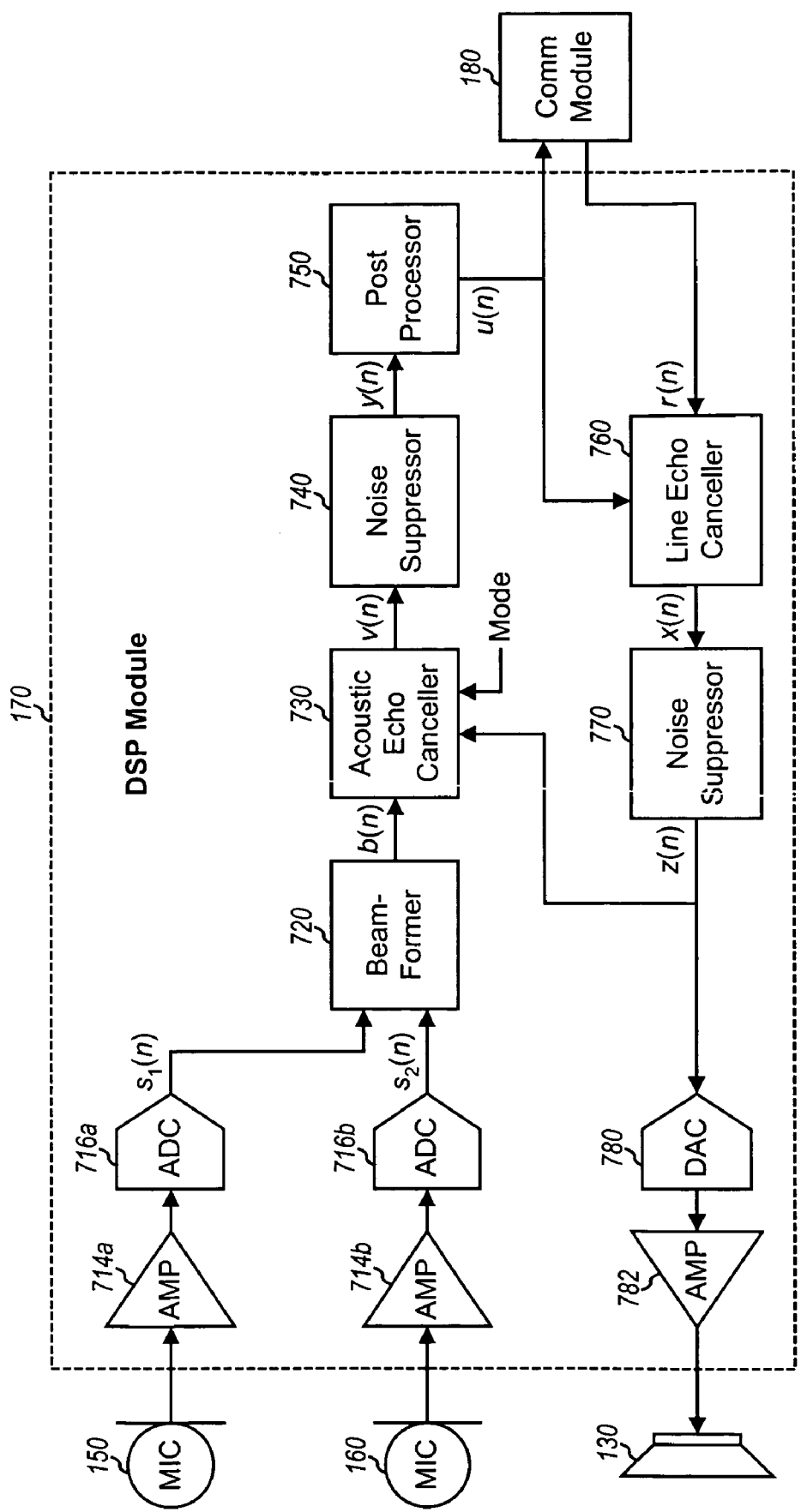
FIG. 7 shows a block diagram of a DSP module for the hands-free apparatus.

FIG. 7 shows a block diagram of an embodiment of DSP module 170 within hands-free apparatus 100. DSP module 170 receives and processes input signals from microphones 150 and 160 and provides an output signal for loudspeaker 130.

For near-end speech, main microphone 150 and reference microphone 160 receive acoustic input and provide near-end input signals to amplifiers 714a and 714b, respectively, within DSP module 170. Each amplifier 714 amplifies its near-end input signal and provides an amplified near-end signal. An analog-to-digital converter (ADC) 716a receives and digitizes the first amplified near-end signal from amplifier 714a and provides a main signal $s_1(n)$. An ADC 716b receives and digitizes the second amplified near-end signal from amplifier 714b and provides a secondary signal $s_2(n)$. A beamformer 720 receives the main and secondary signals, performs beamforming on the two signals, and provides a beamformed signal b(n). An acoustic echo canceller 730 receives the beamformed signal b(n), a far-end output signal z(n) from a noise suppressor 770, and a Mode signal. The Mode signal indicates whether to use the first set of parameters for the speakerphone mode or the second set of parameters for the earpiece mode. Acoustic echo canceller 730 performs acoustic echo cancellation in accordance with the selected set of parameters to remove echo from loudspeaker 130 and provides an echo-canceled near-end signal v(n).

A noise suppressor 740 receives the echo-canceled near-end signal v(n), performs noise suppression to remove noise in the v(n) signal, and provides a noise-suppressed near-end signal y(n). A post-processor 750 receives the noise-suppressed near-end signal y(n), performs post-processing, and provides a processed near-end signal u(n), which is a digital data stream, to communication module 180. Communication module 180 provides communication, for example, via a wireless communication channel such as Bluetooth, Wi-Fi, and so on. Communication module 180 may be implemented in a manner known in the art.

For far-end speech, communication module 180 receives a far-end signal via the communication channel and provides a received far-end signal r(n) to a line echo canceller 760. Line echo canceller 760 also receives the processed near-end signal u(n) from post-processor 750, performs line echo cancellation on the received far-end signal r(n) to remove echo from near-end voice, and provides an echo-canceled far-end signal x(n). Noise suppressor 770 receives the echo-canceled far-end signal, performs noise suppression to remove noise, and provides the far-end output signal z(n). The far-end output signal z(n) is converted to analog by a digital-to-analog converter (DAC) 780. An amplifier 782 amplifies the analog signal and provides an amplified far-end output signal to loudspeaker 130.

The various processing blocks, such as beamformer, acoustic echo canceller, noise suppressor, and line echo canceller may be implemented in various manners known in the art. Exemplary techniques for performing beamforming, echo cancellation, and noise suppression are described in the following commonly assigned U.S. patent applications:

Ser. No. 10/193,689, entitled "Channel Control and Post Filter for Acoustic Echo Cancellation," filed Jul. 10, 2002;

Ser. No. 10/371,991, entitled "Method and System for Nonlinear Echo Suppression," filed Feb. 21, 2003;

Ser. No. 10/371,150, entitled "Small Array Microphone for Acoustic Echo Cancellation and Noise Suppression," filed Feb. 21, 2003; and Ser. No. 10/601,055, entitled "Small Array Microphone for Beam-Forming and Noise Suppression," filed Jun. 20, 2003.

These patent applications are incorporated herein by reference.

The digital signal processing (e.g., beamforming, echo cancellation, and noise suppression) for hands-free apparatus 100 may be implemented by various means. For example, the digital signal processing may be implemented in hardware, software, or a combination thereof. For a hardware implementation, the digital signal processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An earpiece voice communication apparatus, comprising:
   at least one microphone configured to receive acoustic input and to provide at least one input signal, said at least one microphone comprising:
   a uni-directional microphone disposed toward a first direction; and
   an omni-directional microphone disposed toward a second direction substantially perpendicular to the first direction;
   a loudspeaker configured to receive an output signal and to provide acoustic output; and
   at least one volume functional button operable to adjust volume for the loudspeaker, to mute the at least one microphone, to accept or reject an incoming call, or a combination thereof;
   a digital signal processing (DSP) module configured to perform digital signal processing on the at least one input signal and to provide the output signal, and
      wherein the apparatus is operable in one of multiple modes comprising a speakerphone mode and an earpiece mode, and wherein the apparatus is hanging on a user's ear in the earpiece mode and far from the user's ear in the speakerphone mode.

2. The apparatus of claim 1, wherein the uni-directional microphone is used as a main microphone and the omni-directional microphone is used as a reference microphone.

3. The apparatus of claim 1, further comprising:
   a first microphone boot for the uni-directional microphone; and
   a second microphone boot for the omni-directional microphone.

4. The apparatus of claim 3, wherein the first and second microphone boots are formed with an acoustic opaque resilient material.

5. The apparatus of claim 3, wherein the first microphone boot comprises multiple openings to allow sound to travel to front and back of the uni-directional microphone.

6. The apparatus of claim 1, further comprising:
   a first housing for the uni-directional microphone, wherein the uni-directional microphone is mounted within the housing in a manner to avoid making contact with the housing.

7. The apparatus of claim 6, further comprising:
   a second housing for the omni-directional microphone, wherein the first and second housings are isolated.

8. The apparatus of claim 6, further comprising:
   a block of a vibration opaque resilient material attached to a bottom of the first housing.

9. The apparatus of claim 1, further comprising:
   a mode button operable to select one of the multiple modes.

10. The apparatus of claim 1, further comprising:
    a mode button, wherein one of the multiple modes is selected based on the mode button and one or more of the at least one volume functional button.

11. The apparatus of claim 1, further comprising:
    a first functional button to accept or reject an incoming call and wherein the first functional button is larger than the volume functional button.

12. The apparatus of claim 1, wherein the apparatus operates in the earpiece mode as a default mode and operates in the speakerphone mode when selected.

13. The apparatus of claim 1, wherein volume of the loudspeaker is increased slowly when switching from the earpiece mode to the speakerphone mode.

14. The apparatus of claim 1, further comprising:
    an earpiece for attaching the apparatus to the user's ear.

15. The apparatus of claim 1, wherein the DSP module is configured to perform digital signal processing in accordance with a first set of parameters for the speakerphone mode and with a second set of parameters for the earpiece mode.

16. The apparatus of claim 1, wherein the DSP module is configured to perform beamforming, acoustic echo cancellation, noise suppression, or a combination thereof for a near-end voice signal.

17. The apparatus of claim 1, wherein the DSP module is configured to perform line echo cancellation, noise suppression, or a combination thereof for a far-end voice signal.

18. The apparatus of claim 1, further comprising:
    a communication module configured to provide communication between the apparatus and a communication device.

19. The apparatus of claim 18, wherein the communication module is configured to communicate with the communication device via Bluetooth or Wi-Fi.

20. The apparatus of claim 1, wherein the uni-directional microphone and the omni-directional microphone are isolated from each other.

21. An earpiece voice communication apparatus, comprising:
    a uni-directional microphone, disposed toward a first direction, and configured to receive acoustic input and to provide a first input signal;

an omni-directional microphone, disposed toward a second direction substantially perpendicular to the first direction, and configured to receive acoustic input and to provide a second input signal;

a first microphone boot for holding the uni-directional microphone and comprising multiple openings to allow sound to travel to front and back of the uni-directional microphone;

a second microphone boot for holding the omni-directional microphone;

a loudspeaker configured to receive an output signal and to provide acoustic output;

at least one volume functional button operable to adjust volume for the loudspeaker, to mute the at least one microphone, to accept or reject an incoming call, or a combination thereof;

a digital signal processing (DSP) module configured to perform digital signal processing on the first and second input signals and to provide the output signal; and a communication module configured to provide communication between the apparatus and a communication device, and wherein the apparatus is operable in one of multiple modes comprising a speakerphone mode and an earpiece mode, and wherein the apparatus is hanging on a user's ear in the earpiece mode and far from the user's ear in the speakerphone mode.

22. The apparatus of claim 21, wherein the uni-directional microphone and the omni-directional microphone are isolated from each other.

* * * * *